(12) United States Patent
Lambert et al.

(10) Patent No.: US 9,251,325 B2
(45) Date of Patent: Feb. 2, 2016

(54) VERIFYING PASSWORDS ON A MOBILE DEVICE

(71) Applicants: BLACKBERRY LIMITED, Waterloo (CA); CERTICOM CORP., Mississauga (CA)

(72) Inventors: Robert J. Lambert, Waterloo (CA); Robert H. Wood, Waterloo (CA); Brian Lamb, Waterloo (CA)

(73) Assignees: BlackBerry Limited, Waterloo ON (CA); Certicom Corp., Mississauga ON (CA)

( * ) Notice: Subject to any disclaimer, the term of this patent is extended or adjusted under 35 U.S.C. 154(b) by 37 days.

(21) Appl. No.: 14/083,852

(22) Filed: Nov. 19, 2013

(65) Prior Publication Data

US 2014/0082367 A1  Mar. 20, 2014

Related U.S. Application Data

(63) Continuation of application No. PCT/CA2011/050317, filed on May 20, 2011.

(51) Int. Cl.
*H04L 29/00* (2006.01)
*G06F 21/31* (2013.01)
(Continued)

(52) U.S. Cl.
CPC ............ *G06F 21/31* (2013.01); *G06F 21/6209* (2013.01); *H04L 9/3226* (2013.01); *H04L 9/3239* (2013.01); *H04W 12/06* (2013.01); *H04L 2209/38* (2013.01)

(58) Field of Classification Search
CPC .......... H04L 29/06; G06F 21/00; G06F 21/31
USPC ............................................... 713/183; 726/5
See application file for complete search history.

(56) References Cited

U.S. PATENT DOCUMENTS 5,581,700 A   12/1996  Witte
6,735,611 B2   5/2004  Vanstone
(Continued)

OTHER PUBLICATIONS

Trusted Computer Group; "Replacing Vulnerable Software with Secure Hardware"; 2008; 2 pages. (Cited in the International Search Report and Written Opinion of the International Searching Authority, issued in International Application No. PCT/CA2011/050317 on Jan. 25, 2012.).

(Continued)

*Primary Examiner* — Jeffrey Pwu
*Assistant Examiner* — Michael D Anderson
(74) *Attorney, Agent, or Firm* — Fish & Richardson P.C.

(57) ABSTRACT

Methods, systems, and computer programs for verifying a password are disclosed. For example, the password can be verified on a mobile device to control user access to the mobile device. In some implementations, a mobile device includes a user interface, a main processor, and a co-processor. The user interface receives a submitted password value from a user. The main processor calls the co-processor to provide a hash chain input value based on the submitted password value. The main processor evaluates a hash chain based on the hash chain input value provided by the co-processor. Evaluating the hash chain generates a submitted password verification value. The submitted password verification value is compared to a stored password verification value stored on the mobile device. Access to mobile device functionality may be permitted or denied based on a result of the comparison.

23 Claims, 4 Drawing Sheets

(51) Int. Cl.
*H04L 9/32* (2006.01)
*H04W 12/06* (2009.01)
*G06F 21/62* (2013.01)

(56) References Cited

U.S. PATENT DOCUMENTS

| | | | |
|---|---|---|---|
| 7,325,132 B2 | 1/2008 | Takayama et al. | |
| 7,430,293 B2 | 9/2008 | Elbe et al. | |
| 7,720,219 B1 | 5/2010 | Olson et al. | |
| 7,725,730 B2* | 5/2010 | Juels et al. | 713/183 |
| 7,787,629 B1 | 8/2010 | Belenko | |
| 8,209,744 B2* | 6/2012 | Zhu et al. | 726/5 |
| 2004/0025027 A1 | 2/2004 | Balard et al. | |
| 2012/0124662 A1* | 5/2012 | Baca et al. | 726/17 |

OTHER PUBLICATIONS

Elcomsoft, GPU Acceleration FAQ, URL: http://www.elcomsoft.com/gpu_acceleration.html, accessed Apr. 15, 2011, 3 pages.
Elcomsoft, Password Recovery Software, URL: http://www.elcomsoft.com/eppb.html, accessed Apr. 15, 2011, 3 pages.
Fischlin, "Fast Verification of Hash Chains," 2004, 17 pages.
Menezes et al.; "Handbook of Applied Cryptography—Chapter 9"; 1997; 64 pages.
Wikipedia, Coprocessor, URL: http://en.wikipedia.org/wiki/Co-processor, Apr. 4, 2011, 4 pages.
Wikipedia, ARM Architecture, URL: http://en.wikipedia.org/wiki/ARM_architecture, Apr. 10, 2011, 29 pages.
International Search Report and Written Opinion of the International Searching Authority, issued in International Application No. PCT/CA2011/050317 on Jan. 25, 2012; 8 pages.
International Preliminary Report on Patentability in International Application No. PCT/CA2011/050317, dated Nov. 28, 2013, 7 pages.
Goyal et al., "the N/R one time password system," XP55182853, International Conference on Information Technology: Coding and Computing (ITCC'05), vol. II, Jan. 1, 2005, 6 pages.
Lamport, "Password Authentication with Insecure Communication," XP000577349, Communications of the Association for Computing Machinery, Inc., Nov. 1, 1981, 24(11):770-772.
Extended European Search Report in European Application No. 11866361.6, dated Apr. 22, 2015, 7 pages.

* cited by examiner

VERIFYING PASSWORDS ON A MOBILE DEVICE

CLAIM OF PRIORITY

This application is a continuation of International Application No. PCT/CA2011/050317 filed on May 20, 2011, which is hereby incorporated by reference.

BACKGROUND

This specification relates to verifying passwords on a mobile device. Access to a mobile device can be restricted by a password scheme, where access is granted when the user enters the correct password. Password hashing techniques are used to avoid storing an explicit representation of the correct password. A hash chain can be initialized with the correct password value, and the tail of the hash chain output can be stored on the mobile device. When a user requests access to the mobile device, the hash chain is initialized with the password entered by the user, and the tail of the hash chain output is compared with the stored value. Access can be granted or denied based on the comparison.

BRIEF DESCRIPTION OF THE DRAWINGS

Like reference numbers and designations in the various drawings indicate like elements.

DETAILED DESCRIPTION

Mobile devices can utilize hash chains to avoid storing passwords explicitly on the device. The security provided by such password schemes can be improved by increasing the computational resources required to derive the correct password from the hash chain output stored on the device. In some implementations, a hash chain can provide greater security by calling functions executed by specialized data processing hardware on the mobile device. For example, mobile devices often include a general processor and additional specialized data processing hardware configured to efficiently evaluate complex functions. As a particular example, some mobile devices include multimedia co-processors that perform voice and video compression algorithms, image processing algorithms, and other computationally-intensive functions related to processing multimedia data. A hash chain that invokes the computationally-intensive functions performed by the specialized processors may increase the cost of learning the correct password, for example, by a brute-force attack. The particular functions utilized by the hash chain can be tailored to the particular mobile device, for example, based on the data processing hardware included on the device.

Figure 1:
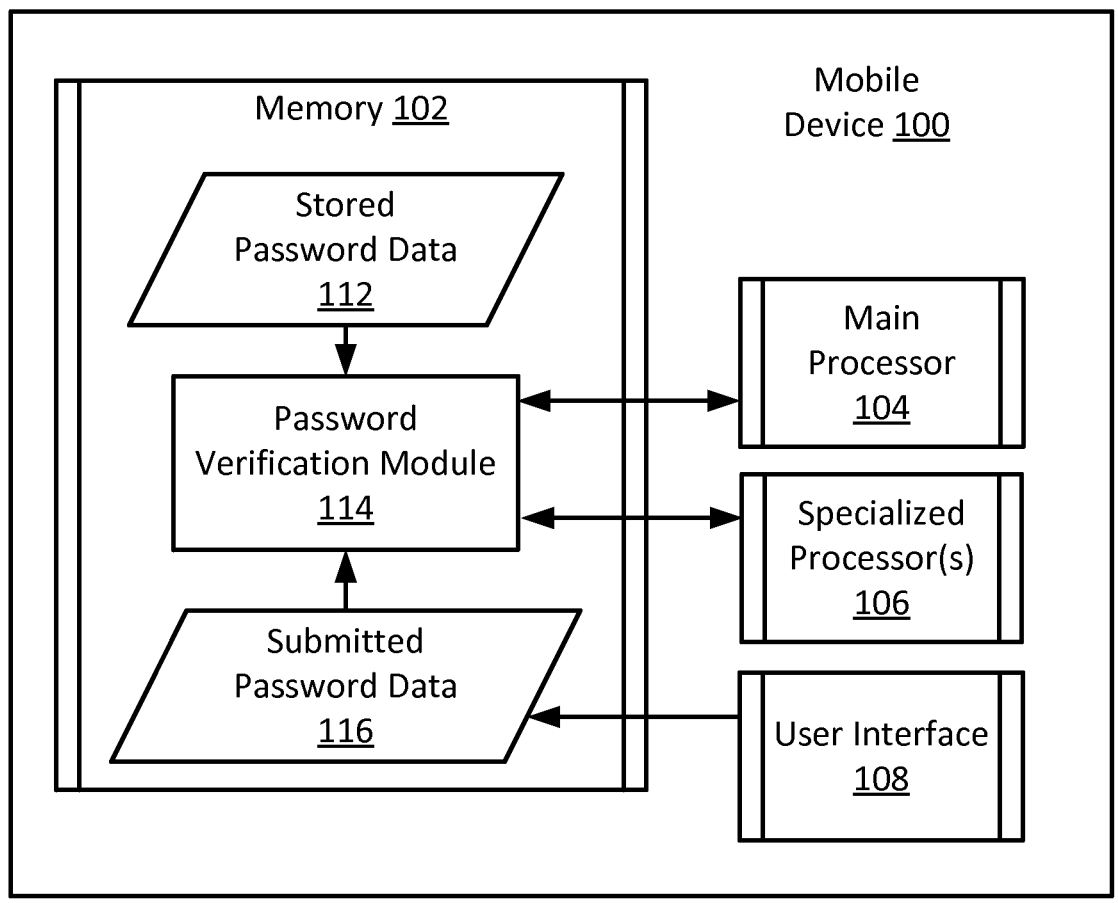
FIG. 1 is a schematic diagram showing aspects of an example mobile device.

FIG. 1 is a schematic diagram showing aspects of an example mobile device 100. The example mobile device 100 includes a memory 102, a main processor 104, one or more specialized processors 106, and a user interface 108. The mobile device 100 may include additional or different features. In some implementations, the mobile device 100 is a handheld device such as a smart phone, a personal digital assistant (PDA), a portable media player, a tablet, or another type of mobile device.

The memory 102 can include any type of data storage media. The memory 102 may include volatile memory, non-volatile memory, or any combination of these and other types of storage media. The memory 102 can include, for example, a random access memory (RAM), a storage device (e.g., a writable read-only memory (ROM), etc.), a hard disk, or another type of storage medium. The memory 102 can store instructions (e.g., computer code) associated with computer applications, programs and computer program modules, and other resources. The memory 102 can store application data and data objects that can be interpreted by applications, programs, modules, or virtual machines running on the mobile device. The memory 102 can be implemented as one or more hardware structures of the mobile device 100.

The main processor 104 can include any type of data processing apparatus that controls one or more aspects of operation on the mobile device 100. In some implementations, the main processor 104 is a general purpose microprocessor that can run applications and programs by executing or interpreting software, scripts, functions, executables, and other types of computer program code. The main processor 104 can be programmed to control operation of the mobile device 100. For example, the mobile device 100 may include an operating system, a virtual machine, or another type of device platform executed by the mobile device 100. The main processor 104 can control operation of the mobile device 100 in an additional or different manner. A mobile device can include multiple main processors 104. The main processor 104 can be implemented as one or more hardware structures of the mobile device 100.

The main processor 104 can control one or more other components of the mobile device 100. For example, the main processor 104 may access information on the memory 102 and store information to the memory 102, the main processor 104 may invoke the specialized processors 106 to performed specialized functions, the main processor 104 may interact with the user interface 108 to receive input provided by a user, or the main processor 104 may perform a combination of these and other types of functions. The main processor 104 can operate as a master component that invokes, calls, or otherwise controls the operation of one or more other components of the mobile device 100. Some aspects or components of the mobile device 100 may operate autonomously or may be controlled by a different component, other than the main processor 104.

The specialized processors 106 can include any type of data processing apparatus configured to supplement functionality of the main processor 104. For example, the specialized processors 106 may be configured to provide computationally-intensive functionality when invoked by the main processor 104. The specialized processors 106 can include one or more co-processors or another type of data processing apparatus. A co-processor can include hardware, firmware, or other features configured to execute a class of operations or a class of functions faster or otherwise more efficiently than the main processor 104. The specialized processors 106 can include a multimedia co-processor, a cryptographic co-processor, or a combination of these and other co-processors. A multimedia co-processor may accelerate multimedia rendering on the device (e.g., video and audio playback, etc.). A cryptographic co-processor may accelerate the decryption of content or other data. Each of the specialized processors 106 can be implemented as one or more hardware structures of the mobile device 100. In some implementations, the specialized processors 106 can run independently of the main processor 104.

Operation of the specialized processors 106 can be supervised or otherwise controlled by the main processor 104. The main processor 104 can offload computationally-intensive tasks to the specialized processors 106, for example, to improve system performance. Offloading tasks to the specialized processors 106 can allow the main processor 104 to perform other tasks, and in some cases the offloaded task is performed faster by the specialized processors 106 than by the main processor 104. In some implementations, the specialized processors 106 are programmed or configured to perform a more limited range of specialized tasks than the main processor 104. Moreover, the specialized processors 106 may have more limited control over other components of the mobile device 100, as compared to the main processor 104. For example, the specialized processors 106 may have limited or no direct access to the memory 102, the user interface 108, or other components of the mobile device 100. A specialized processor may be configured in a master-slave relationship with the main processor 104.

The user interface 108 can include any type of interface capable of receiving input from a user. For example, the user interface 108 may include a touchscreen, a pointing device, a trackball, a keypad, a microphone, or another type of interface. The user interface 108 can include a sensor or transducer that detects user interaction and converts the user interaction to voltage or current a communication bus or another medium. The user interface 108 can provide the information received from the user to other components of the mobile device 100. For example, the main processor 104 may receive information from the user interface 108 and store the information in the memory 102. The user interface 108 can be implemented as one or more hardware components of the mobile device 100. In some instances, the user interface 108 operates in conjunction with a software module (e.g., a device driver) executed on the main processor 104.

The mobile device 100 can include a data communication interface. In some implementations, the data communication interface can receive and transmit data in analog or digital form over communication links such as a serial link, wireless link (e.g., infrared, radio frequency, etc.), parallel link, or another type of link. The data communication interface allows the mobile device 100 to communicate with external components or systems. For example, a communication link may allow the mobile device 100 to communicate with a cellular network, a local area network, a mobile device accessory or component, or another external system.

In the example shown in FIG. 1, stored password data 112, a password verification module 114, and submitted password data 116 are stored on the memory 102. Generally, some or all of the stored password data 112, the password verification module 114, and the submitted password data 116 can be stored separately, for example, on different memory devices and in different data formats. The stored password data 112, the password verification module 114, and the submitted password data 116 can be stored in any format, for example any file or data format, and as any data type. At a high level, the user provides the submitted password data 116 through the user interface 108, and the password verification module 114 determines whether the user has submitted the correct password. For example, the password verification module 114 may evaluate the submitted password data 116 and compare the output with the stored password data 112.

The password verification module 114 can include any software, hardware, firmware, or combinations thereof, that can verify the submitted password. The password verification module 114 can evaluate a password verification function (e.g., a hash chain or another type of password verification function) to verify the password. For example, the password verification module 114 can utilize the techniques demonstrated by the process 300 shown in FIG. 3, the process 400 shown in FIG. 4, or another type of technique. The password verification module 114 can include instructions that are executed by the main processor 104. The some of the instructions included in the password verification module 114 can invoke the specialized processors 106 when the instructions are executed by the main processor 104.

The password verification module 114 can utilize the password verification function to avoid storing passwords explicitly on the mobile device 100. For example, the password verification module 114 can utilize a hash chain or another type of function for which the function inputs are not easily derived from the function outputs. Passwords can be mapped to password verification values by evaluating the password verification function based on the passwords, and the password verification value can be stored on the mobile device. In some instances, the passwords cannot be efficiently or conveniently derived from the password verification values stored on the mobile device 100. The security of such schemes can be improved by increasing the complexity of the password verification function.

In some implementations, the complexity of a password verification function can be increased by invoking computationally-intensive operations performed by the specialized hardware available on the mobile device 100. For example, the mobile device 100 can evaluate a password verification function based on processes executed by the specialized processors 106. As such, an attacker would, in some cases, incur a greater computational and/or hardware cost to derive the passwords from the password verification values in the stored password data 112.

In some implementations, the password verification function is a hash chain. The password verification value in the stored password data 112 can be generated by initializing the hash chain with the correct password value. The tail of the hash chain can be stored in the memory 102 as a password verification value. The stored password data 112 can include the password verification value, as well as additional or different information. The submitted password data 116 can include the password entered by a user requesting access to the mobile device 100. To validate access, the hash chain is initialized based on the password submitted by the user, and the value at the end of the resulting hash chain output is compared with the password verification value in the stored password data 112. Access can be granted or denied based on a result of the comparison. Additional or different types of password verification functions can be used. As such, although some of the examples discussed herein refer to a hash chain, some implementations can utilize other types of password verification functions.

In some cases, a long hash chain can be advantageous. For example, a long hash chain may require an attacker in possession of the stored value to encounter a greater computational expense to derive the correct password. As such, the attacker incurs the cost of trying many prospective passwords, but the honest application will typically only need to try one password (assuming the correct password is submitted). In some cases, short hash chains can also be advantageous. A hash chain of any length can utilize a salt value and a counter to increase the computational cost that the attacker would incur when attempting to derive the correct password. The salt value and related information can be stored in the stored password data 112.

Generally, the hash chain can utilize the computing power of any processing hardware on the mobile device 100. The hardware components of the mobile device 100 can be identified in the stored password data 112. For example, the stored password data 112 may include a vector indicating that the mobile device has multimedia co-processing capabilities and SHA-1 hashing capabilities. The password verification module 114 can tailor the hash chain to the specific hardware capabilities of the mobile device. In some implementations, the password verification module 114 selects the hash chain inputs based on the type of specialized co-processors 106 on the mobile device 100. For example, the password verification module 114 may incorporate a discrete cosine transform in the hash chain based on a vector in the stored password data 112 that indicates multimedia co-processing capabilities, or the password verification module 114 may incorporate a SHA-1 hashing operation in the hash chain based on a vector in the stored password data 112 that indicates SHA-1 co-processing capabilities. Tailoring the hash chain to the particular hardware of the mobile device 100 can allow the mobile device 100 to compute a hash chain that is both longer and more difficult for the attacker to search, thus improving device security in some implementations.

The hash chain can take the form of an iterative function, where the first iteration is evaluated based on the submitted password value and each subsequent iteration is evaluated based on the output provided by one or more prior iterations. For example, in some cases a hash chain initialization value $V_0$ includes or is derived from the password p. The hash chain can be represented $V_i=H(\{f_{k,i-1}(S_{i-1})\}_k)$, where H represents a cryptographic hashing function, and $\{f_{k,i-1}(S_{i-1})\}_k$ represents a sequence of functions operating on a data set $S_{i-1}$. The k subscript can index different types of functions, and the i subscript can index different iterations. The particular form of each function $f_{k,i-1}(S_{i-1})$ can be determined based on the hardware available on the mobile device 100, based on the desired level of security, based on the computing speeds of the co-processors available, and other considerations. For example, if it is determined that more computationally powerful hardware is available (or will be available), the length of the hash chain and the complexity of the functions invoked by the hash chain may be increased. As such, the form of the hash chain function and order of the data can take a variety of forms that maintain or improve the security of the password scheme.

The inputs $S_{i-1}$ for the set of functions $f_{k,i-1}(S_{i-1})$ can include information from the stored password data 112, information from the submitted password data 116, information derived by the password verification module 114, or any combination of these and other types of information. For example, the inputs $S_{i-1}$ can include the outputs $\{V_j\}$ for $j<i$ generated by prior iterations of the cryptographic hashing function H; the inputs $S_{i-1}$ may include values $\{c_j\}$ for $j<i$ that change deterministically with each iteration, such as counter values; the inputs $S_{i-1}$ may include a salt value s, the submitted password value p, as well as other information. The cryptographic hashing function can be iterated for a number of iterations z, and the final iteration can produce a hash chain termination value $V_z$. In some cases, the hash chain termination value $V_z$ at the tail of the hash chain is stored in the stored password data 112. Generally, any subset of the information included in the hash chain output $\{V_i\}_{i=0}^z$ can be stored.

As a specific example, each iteration of the hash chain can be represented $V_i=H(S_{i-1}, D_{i-1}(S_{i-1}), A_{i-1}(S_{i-1}))$, where $D_i$ represents a discrete cosine transform, and $A_i$ represents an AES encryption or decryption function. The subscripts for $D_i$ and $A_i$ indicate that the functions can change for each iteration. In some examples, the cryptographic hashing function H is evaluated by the main processor 104 on the mobile device 100, and the discrete cosine transform $D_i$ and the AES encryption or decryption function $A_i$ are evaluated by specialized processors 106 on the mobile device 100. For example, the discrete cosine transform $D_i$ can be evaluated by a multimedia co-processor, and the AES encryption or decryption function $A_i$ can be evaluated by a cryptographic co-processor. In such cases, the main processor 104 can invoke the multimedia co-processor to provide the hash chain input values $D_{i-1}(S_{i-1})$ for each iteration, and the main processor 104 can invoke the cryptographic co-processor to provide the hash chain input values $A_{i-1}(S_{i-1})$ for each iteration.

In some implementations, one or more of the specialized processors 106 only provides input values for certain iterations of the cryptographic hashing function H. For example, a first co-processor may provide input for all iterations, while another co-processor only provides input for every second or third iteration, etc. Data provided by the specialized processors 106 can be mixed into the hash chain at a rate that is based on the differences in the computing time for evaluating the cryptographic hashing function H at the main processor and the computing time for evaluating the specialized functions at the specialized processors 106. For example, if the time required to evaluate $D_i$ is twice that needed to compute H, the values from $D_i$ can be incorporated upon every other iteration. Some outputs of $D_i$ may be null. A cryptographic operation or process, or a preprocessing operation or process, may be configured to identify a computational burden and consider the computational burden relative to a number of cores available. If the cryptographic operation determines that more than a threshold degree of processing is required per processor, the cryptographic operation may configure the tasks to be performed in a pipeline mode or another manner that increases hardware utilization.

If a function evaluated by a co-processor requires some time to compute its output, constraints can be placed on which elements of the input sequences $S_{i-1}$ can be sampled by the function. For example, some functions can be configured to sample elements available sufficiently distant in the past. In some implementations, larger inputs to the cryptographic hashing function H may take extra time to generate by the co-processors, which can affect the timing of when the inputs are available from the co-processors. In some implementations, a more uniform or consistent computing time for each iteration of the cryptographic hashing function H can be achieved by either reusing co-processor data, or filling such fields with other data, even constant data, until the co-processor is ready. In some implementations, certain values can be withheld from being used as inputs for the co-processor functions, the cryptographic hashing function H, or both. For example, one or more of the functions may not make use of the salt, counter, or other value at every iteration, where appropriate.

In some implementations, the stored password data 112 includes the hash chain termination value $V_z$ or a related value, a salt s, and deterministic value information c. The stored password data 112 can also include a vector or another data structure that describes functions that can be used to provide hash chain inputs when a hash chain is evaluated on the mobile device 100. The vector can also indicate which iterations of the hash chain can utilize each of the functions. For example, on a mobile device 100 without a SHA-1 engine, the vector in the stored password data 112 can indicate that the SHA-1 is not to be used in the hash chain. As another example, on a mobile device 100 that includes one or more co-processors capable of SIMD (i.e., single instruction multiple data) operations (e.g., an ARM NEON co-processor), the vector in the stored password data 112 can indicate the presence or amount of SIMD hardware on the mobile device 100.

Figure 2:
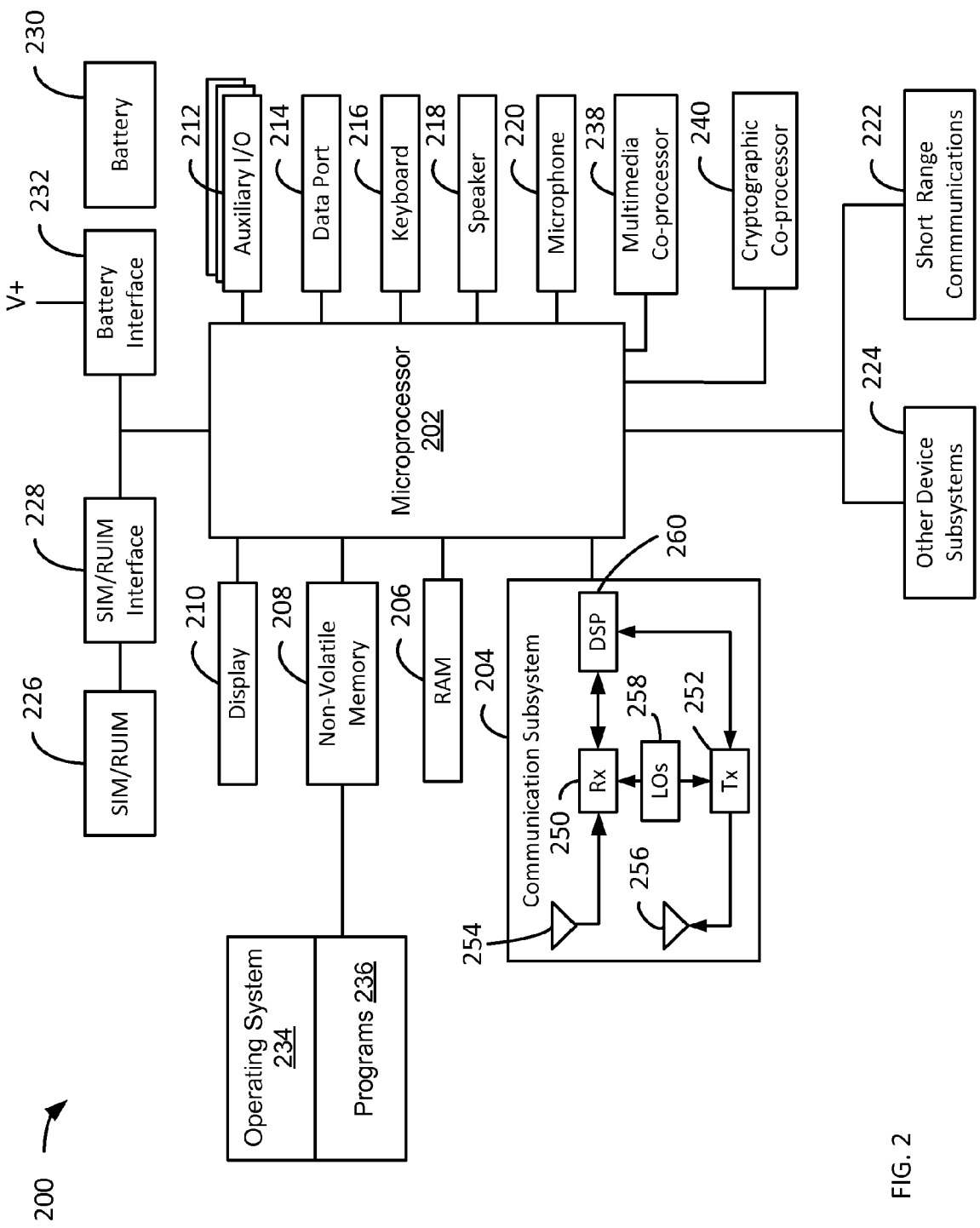
FIG. 2 is a schematic diagram showing aspects of another example mobile device.

FIG. 2 is a schematic diagram showing aspects of an example mobile device 200. For example, the mobile device 200 can be a BLACKBERRY® mobile device and/or another type of mobile device. In some implementations, the mobile device 200 is a dual-mode mobile device. The example mobile device 200 in FIG. 2 includes a microprocessor 202, a communication subsystem 204, random access memory (RAM) 206, non-volatile memory 208, a display 210, one or more auxiliary input/output (I/O) devices 212, a data port 214, a keyboard 216, a speaker 218, a microphone 220, a short-range wireless communications subsystem 222, other device subsystems 224, a SIM/RUIM card (i.e., a Subscriber Identity Module or a Removable User Identity Module) 226, a SIM/RUIM interface 228, a rechargeable battery 230, a battery interface 232, a multimedia co-processor 238, a cryptographic co-processor 240, and possibly other components. The mobile device 200 may include the same, additional, and/or different features, which may be arranged and/or operate in the manner shown or in a different manner.

The example mobile device 200 is a battery-powered device that includes a battery interface 232 that receives direct current electrical power from one or more rechargeable batteries 230. The battery 230 can be a smart battery with an embedded microprocessor or a different type of battery. The battery interface 232 may be coupled to a regulator (not shown), which may assist the battery 230 in providing power V+ to the mobile device 200. Additionally or alternatively, the mobile device 200 may receive power from an external source (e.g., an alternating current power source, an adapter, a converter, etc.) and/or a different type of internal power source.

The example mobile device 200 shown in FIG. 2 is a two-way communication device having voice and data communication capabilities. The mobile device 200 may communicate over wireless networks, including wireless telecommunication networks, wireless data networks, combined voice and data networks, and/or other types of wireless networks. Thus, the mobile device 200 may communicate over a voice network, such as any of the analog or digital cellular networks, and may also communicate over a data network. Voice and data networks may be implemented as separate communication networks using separate infrastructure, such as base stations, network controllers, etc., or the voice and data networks may be integrated into a single wireless network. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or others.

In the example mobile device 200 shown in FIG. 2, the communication subsystem 204 includes a receiver 250, a transmitter 252, antennae 254 and 256, one or more local oscillators 258, a digital signal processor (DSP) 260 and possibly other features. The antennae 254 and 256 may include antenna elements of a multiple-element antenna, embedded antennae, radio frequency (RF) antennae, and/or other types of antennae. The communication subsystem 204 is used to communicate with the network. The DSP 260 is used to receive and send signals through the receiver 250 and the transmitter 252, respectively, and the DSP 260 provides control information to the receiver 250 and the transmitter 252. For example, the gain levels applied to communication signals in the receiver 250 and the transmitter 252 may be adaptively controlled through automatic gain control algorithms implemented in the DSP 260. Additional and/or different types of control algorithms may be implemented in the DSP 260 to provide more sophisticated control of the communication subsystem 204.

In some implementations, the local oscillator 258 is a single local oscillator that provides a reference signal for the receiver 250 and the transmitter 252, for example, where voice and data communications occur at a single frequency, or closely-spaced sets of frequencies. Alternatively, for example if different frequencies are utilized for voice communications and data communications, the local oscillator 258 may include multiple local oscillators that are used to generate multiple different frequencies corresponding to the voice and data networks. Information, which may include both digital voice and digital data information, can be communicated within the mobile device 200 to and from the communication subsystem 204 through a link or bus between the DSP 260 and the microprocessor 202. The design and configuration of the communication subsystem 204, such as frequency band, component selection, power level, etc., may depend on the communication network in which the mobile device 200 is intended to operate. For example the communication subsystem 204 may be configured for 2G, 2.5G, 3G, 4G, and other voice and data networks, such as GSM, CDMA2000, GPRS, EDGE, W-CDMA (UMTS), FOMA, EV-DO, TD-SCDMA, HSPA, HSOPA, and the like.

After any required network registration or activation procedures have been completed, the mobile device 200 may send and receive communication signals, including both voice and data signals, over the wireless networks. Signals received by the antenna 254 from the communication network are routed to the receiver 250, which provides signal amplification, frequency down conversion, filtering, channel selection, etc., and may also provide analog to digital signal conversion. Analog to digital conversion of the received signal allows the resulting digital signal to be decoded by the DSP 260. Signals to be transmitted to the network are processed (e.g., modulated, encoded, etc.) by the DSP 260 and are then provided to the transmitter 252 for digital to analog conversion, frequency up conversion, filtering, amplification and transmission to the communication network via the antenna 256.

In some implementations, the mobile device 200 can send and receive communication signals over the wireless network after wireless network registration or activation procedures have been completed. The wireless network registration or activation procedures for the mobile device 200 may vary based on the type of network or networks with which the mobile device 200 operates. Wireless network access for the example mobile device 200 shown in FIG. 2 is associated with a subscriber or user of the mobile device 200. In particular, the SIM/RUIM card 226 in the SIM/RUIM interface 228 identifies the subscriber or user of the mobile device 200. With the SIM/RUIM card 226 in the SIM/RUIM interface 228, a subscriber can access all subscribed services through the wireless network. For example, subscribed services may include web browsing, e-mail, voice mail, Short Message Service (SMS), Multimedia Messaging Services (MMS), and/or others. The SIM/RUIM card 226 in the SIM/RUIM interface 228 communicates with the microprocessor 202 on the mobile device 200. To identify the subscriber, the SIM/RUIM card 226 may include user parameters, such as an International Mobile Subscriber Identity (IMSI) and/or another type of subscriber identifier. The SIM/RUIM card 226 may store additional and/or different subscriber information, including calendar information, call log information, contacts information, and/or other types of information. Additionally or alternatively, user identification information can also be stored in the non-volatile memory 208.

The data port 214 may include a serial port, a parallel port, and/or another type of connection port. In some implementations, the data port 214 is a Universal Serial Bus (USB) port that includes data lines for data transfer and a supply line that can provide a charging current to charge the battery 230 of the mobile device 200. The mobile device 200 may be manually synchronized with a host system, for example, by connecting the mobile device 200 through the data port 214 (e.g., in an interface cradle and/or another type of wired connection) that couples the mobile device 200 to a data port of a computer system or other device. The data port 214 may also be used to enable a user to set preferences through an external device or software application, or to download other programs for installation. The wired connection of the data port 214 may be used to load an encryption key onto the device, which may be a more secure method than exchanging encryption information via the wireless network.

The short-range communications subsystem 222 provides for communication between the mobile device 200 and different systems or devices, without the use of the wireless network. For example, the short-range communications subsystem 222 may include an infrared or radio frequency device and associated circuits and components for short-range communication. Examples of short-range communication standards include standards developed by the Infrared Data Association (IrDA), BLUETOOTH®, the 802.11 family of standards developed by IEEE, and others.

The microprocessor 202 manages and controls the overall operation of the mobile device 200. Many types of microprocessors or microcontrollers may be used. Additionally or alternatively, a single DSP 260 may be used to carry out one or more functions of the microprocessor 202. Low-level communication functions, including data and voice communications, may be performed through the DSP 260 in the communication subsystem 204. High-level communication applications, such as voice communication applications, data communication applications, and/or other types of software applications may be stored in the non-volatile memory 208 for execution by the microprocessor 202. The microprocessor 202 also interacts with other device subsystems, such as the display 210, the RAM 206, the auxiliary input/output (I/O) devices 212, the data port 214, the keyboard 216, the speaker 218, the microphone 220, the SIM/RUIM interface 228, the battery interface 232, the short-range communications subsystem 222, and any other device subsystems generally designated as 224.

The microprocessor 202 can be configured to call the multimedia co-processor 238 to execute specialized functions related to multimedia data processing. For example, the multimedia co-processor 238 can perform image processing functions, video compression functions, audio compression functions, and other types of multimedia functions. The microprocessor 202 can invoke the multimedia co-processor 238 for some aspects of device operation. For example, the multimedia co-processor 238 may be configured to render graphics, compress or de-compress video, image, or audio data, and perform other mobile device functions. In addition, the multimedia co-processor 238 can be utilized in a password verification scheme. For example, the multimedia co-processor 238 may be called by the microprocessor 202 to provide inputs for a password verification function evaluated by the microprocessor 202.

The microprocessor 202 can be configured to call the cryptographic co-processor 240 to execute specialized functions related to cryptographic data processing. For example, cryptographic co-processor 240 can perform cryptographic encryption functions, cryptographic decryption functions, and other types of cryptographic functions. The microprocessor 202 can invoke the cryptographic co-processor 240 for some aspects of device operation. For example, the cryptographic co-processor 240 may be configured to generate and verify digital signatures, encrypt or decrypt messages, and perform other mobile device functions. In addition, the cryptographic co-processor 240 can be utilized in a password verification scheme. For example, the cryptographic co-processor 240 may be called by the microprocessor 202 to provide inputs for a password verification function evaluated by the microprocessor 202.

The non-volatile memory 208 includes erasable persistent storage, for example, flash memory, battery-backed-up RAM, and/or other types of memory. In the example shown in FIG. 2, the non-volatile memory 208 stores instructions and data associated with an operating system 234, programs 236 that provide various types of functionality for the mobile device 200, and other types of information. The non-volatile memory 208 may include a file system to facilitate storage of data items on the device. For example, the operating system 234, the programs 236, and/or other modules executed on the microprocessor 202 may store, retrieve, modify, delete, and/or otherwise manipulate data by accessing (e.g., read, write, etc.) the file system provided on the non-volatile memory 208.

Data stored in the non-volatile memory 208 and/or other computer-readable media on the mobile device 200 may include user application data, text files, image files, voicemail data, and other data generated by the user at the mobile device 200 or received and stored by the mobile device 200. The user application data may include, for example, e-mail message data, address book data, contact information data, calendar appointment data, instant message data, SMS message data, voicemail data, user-entered data, and/or other types of application data. Voicemail data may include digitized audio recordings and/or stub entries available for viewing in a messaging application indicating the availability of a voicemail message stored at another location. User-entered data may include text-based, graphic, or other multimedia files loaded onto the mobile device 200 by the user.

The operating system 234 controls low-level functions of the mobile device 200 and facilitates operation of the programs 236. For example, the operating system 234 may provide an interface between one or more of the programs 236 and one or more hardware components on the mobile device 200. The programs 236 include computer program modules that can be executed by the microprocessor 202 (and/or the DSP 260 in some instances). In some implementations, one or more of the programs 236 are executed by the microprocessor 202 and provide a high-level interface between a user and the mobile device 200. The user interface provided by a program 236 typically includes a graphical component provided through the display 210, and may additionally include an input/output component provided through the auxiliary I/O devices 212, the keyboard 216, the speaker 218, and/or the microphone 220. The operating system 234, specific device applications or programs 236, or parts thereof, may be temporarily loaded into a volatile store, such as RAM 206, for faster operation. Moreover, received communication signals may also be temporarily stored to RAM 206 before they are written to a file system in the non-volatile memory 208.

The programs 236 stored in the non-volatile memory 208 may include, for example, a message application, a calendar application, one or more third party applications, and other types of applications. The programs 236 may include additional or different modules, programs, or applications, such as, for example, a Personal Information Manager (PIM) module, a connect module, a device state module, an IT policy module, a multi service platform manager, and/or others. The programs 236 may include programs that control basic device operations, which would typically be installed on the mobile device 200 during its manufacture and/or initial configuration. Other types of software applications, such as, for example, third party applications and/or other types of modules, may be added after the manufacture and initial configuration of the mobile device 200. Examples of third party applications include games, utilities, internet applications, etc. Generally, any of the programs 236 may be updated and/or modified at any time. The additional applications and/or updates to applications can be loaded onto the mobile device 200 through the wireless network, the auxiliary I/O devices 212, the data port 214, the short-range communications subsystem 222, or any other suitable device subsystem 224. The non-volatile memory 208 may also store keys, which may include encryption and decryption keys and addressing information for use in communicating between the mobile device 200 and servers.

The non-volatile memory 208 can include a password verification module. For example, the non-volatile memory 208 can include the password verification module 114 of FIG. 1 or another type of password verification module. The password verification module 114 may implement a password scheme that regulates access to one or more aspects of the mobile device 200. For example, the operating system 234 may require password verification prior to granting device access. As another example, one or more of the programs 236 may require password verification prior to granting access to some aspects of the program's functionality or data. As another example, one or more hardware components may require password verification prior to use or at other times. The password verification module may be utilized to regulate access to other features or components of the mobile device 200. The password verification module of the mobile device 200 can include instructions that are executed by the microprocessor 202. The instructions may include statements or function calls that invoke the multimedia co-processor 238, the cryptographic co-processor 240, or another data processing hardware component on the mobile device 200. For example, the password verification module may evaluate a hash chain or another type of password verification function based on inputs provided by the multimedia co-processor 238 and the cryptographic co-processor 240.

Figure 3:
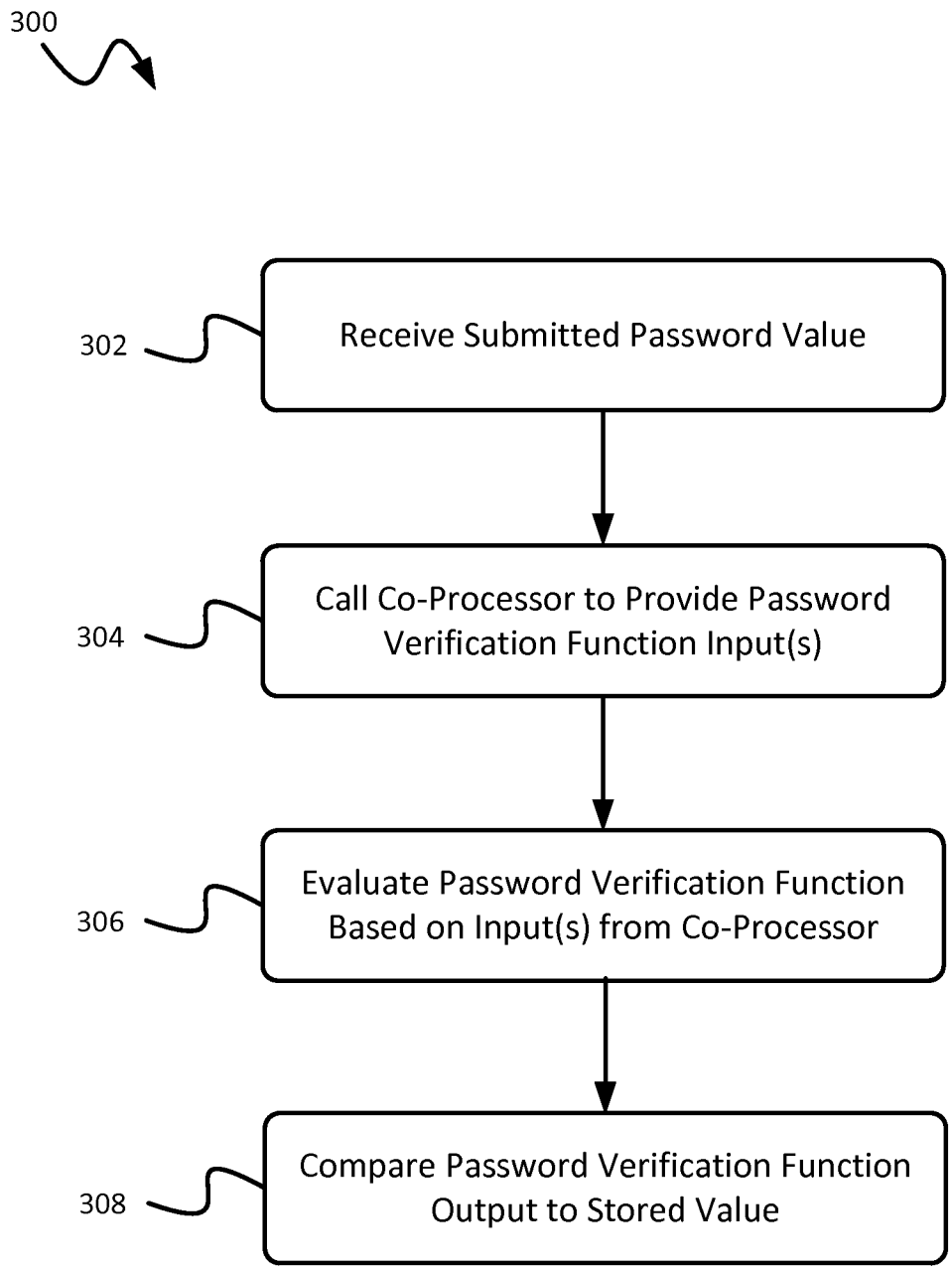
FIG. 3 is a flow diagram showing an example technique for verifying a password on a mobile device.

FIG. 3 is a flow diagram showing an example process 300 for verifying a password on a mobile device that includes a main process and a co-processor. In some implementations, the mobile device includes multiple main processors, multiple co-processors, or both. For example, all or part of the process 300 can be performed by the mobile device 100 of FIG. 1, the mobile device 200 of FIG. 2, or another type of mobile device. Some implementations of the example process 300 shown in FIG. 3 can be performed by another type of computing system other than a mobile device. In some example implementations, one or more aspects of the process 300 can be implemented based on the techniques described with respect to FIG. 4. The example process 300 can include additional or different operations, and the operations may be executed in the order shown or in a different order. In some implementations, one or more operations in the process 300 can be repeated or executed in an iterative fashion.

At 302, a submitted password value is received. For example, a user may provide the submitted password value through a user interface. The submitted password value can be received at the main processor of the mobile device. The submitted password value can be stored and retrieved from memory or otherwise accessed on the mobile device.

At 304, a co-processor is called to provide one or more input values for a password verification function. The password verification function can include a hash chain or another type of function. The co-processor can be called by the main processor of the mobile device. For example, the main processor may call the co-processor to provide hash chain input values. The co-processor can provide hash chain input values, iteratively, sequentially, in parallel, or in another manner.

At 306, the password verification function is evaluated based on the password verification input values provided by the co-processor. The password verification function can be evaluated by the main processor. The password verification function can include multiple iterations of one or more sub-functions. For example, a hash chain can include one or more iterations of a cryptographic hashing function. The main processor of the mobile device can evaluate each iteration of the sub-function. The co-processor can be called upon each iteration to provide sub-function inputs, or the co-processor can be called upon a subset of the iterations to provide sub-function inputs.

Evaluating the password verification function generates a submitted password verification value. For example, the password verification value can be the tail of a hash chain output. In some implementations, the hash chain includes z iterations of a hash function, and the hash chain output can be represented $\{V_i\}_{i=0}^{z}$ where $V_i$ represents the output of the $i^{th}$ iteration of the hash function. The hash chain initialization value $V_0$ can include the submitted password value (received at 302), and the submitted password verification value can include the hash chain termination value $V_z$.

At 308, the output of the password verification function is compared to a stored value. The stored value is based on the correct password. As such, if the submitted password value is the correct password, the password verification function output is equal to the stored value. Conversely, if the submitted password value is not the correct password, the password verification function output will, with high probability, be unequal to the stored value. For example, the submitted password verification value can be the hash chain termination value $V_z$, and the hash chain termination value can be compared to a stored hash chain termination value that was previously generated based on the correct password.

Figure 4:
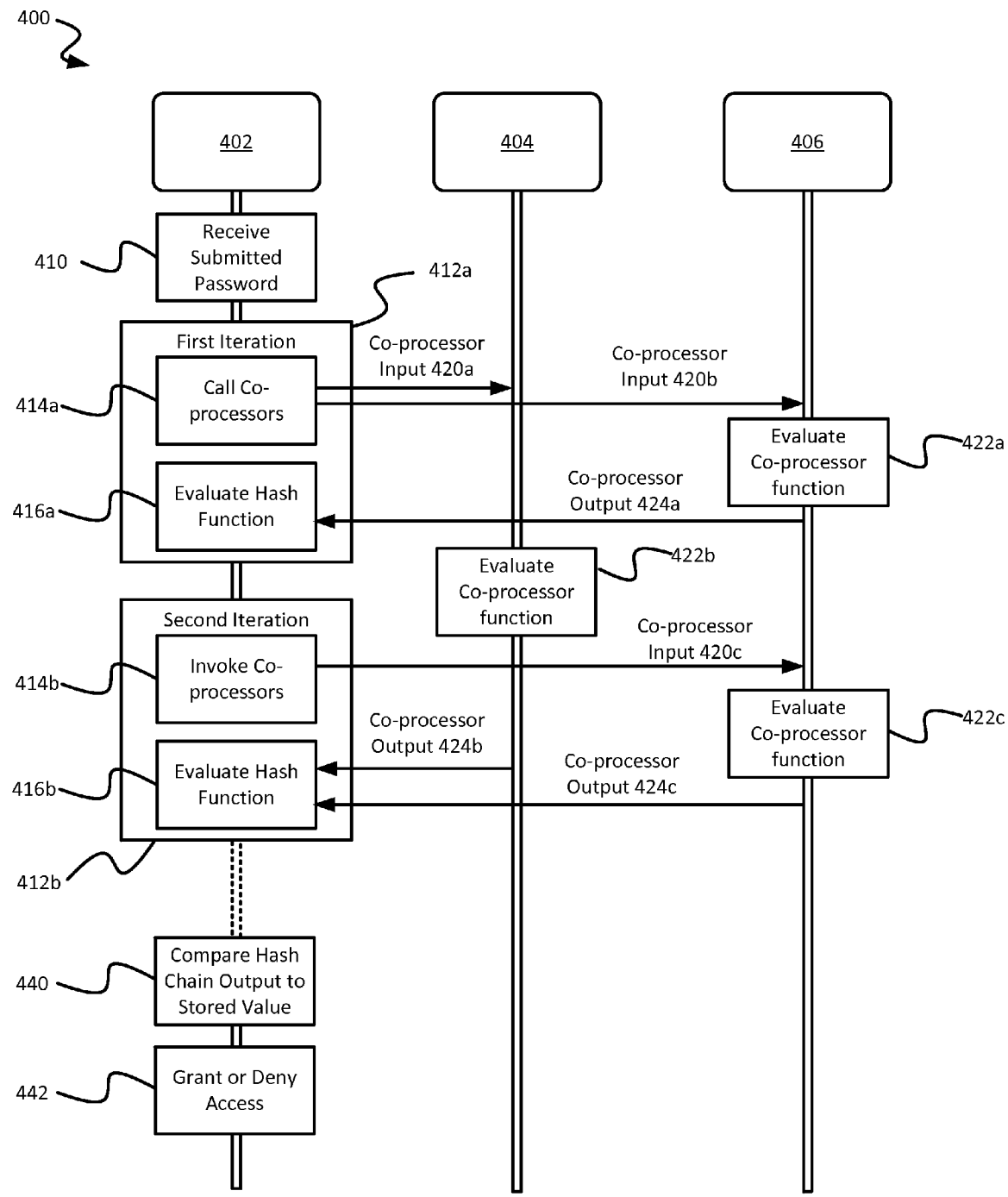
FIG. 4 is a flow diagram showing an example technique for verifying a password on a mobile device.

FIG. 4 is a flow diagram showing an example process 400 for verifying a password on a mobile device. For example, all or part of the process 400 can be performed by the mobile device 100 of FIG. 1, the mobile device 200 of FIG. 2, or another type of mobile device. Some implementations of the example process 400 shown in FIG. 4 can be performed by another type of computing system. In some example implementations, aspects of the process 400 shown in FIG. 4 can be used to perform one or more operations of the process 300 shown in FIG. 3. The example process 400 can include additional or different operations, and the operations may be executed in the order shown or in a different order. In some implementations, one or more operations in the process 400 can be repeated or executed in an iterative fashion.

The example process 400 shown in FIG. 4 includes operations performed by a main processor 402, a first co-processor 404, and a second co-processor 406 of a mobile device. For example, the main processor 402 can be the main processor 104 of FIG. 1, the microprocessor 202 of FIG. 2, or another type of main processor. The co-processors 404 and 406 can include attributes of the specialized processors 106 in FIG. 1, the multimedia co-processor 238, the cryptographic co-processor 240, or another type of data processing apparatus. Additional or different types of hardware, software, and firmware components of the mobile device may be utilized to execute one or more operations of the process 400. For example, the components shown in FIG. 4 (i.e., the main processor 402 and the co-processors 404, 406) can communicate with each other on a data bus of the mobile device, data values can be stored to and retrieved from a memory of the mobile device, a user interface of the mobile device can provide information based on a user interaction, and a data communication interface of the mobile device can provide information from an external system or component.

Some aspect of the mobile device (e.g., an application running on the mobile device, a hardware component of the mobile device, the mobile device operating system, etc.) is regulated by a password protection scheme. When a user or an application requests access to the password-regulated aspect of the mobile device, the user or application submits a password. The example process 400 can be used to verify that the submitted password is the correct password, and access can be approved or denied accordingly. At a high level, a hash chain is initiated based on the submitted password, and the hash chain output is compared to a stored value. The stored value represents the output of the hash chain when the hash chain is initiated by the correct password. In the example shown in FIG. 4, the hash chain includes multiple iterations of a cryptographic hash function. Other types of hash chains may be used. Moreover, although the process 400 is described with respect to a hash chain, other types of password verification functions may be used.

At 410, the main processor 402 receives a submitted password. The submitted password, or information derived from the submitted password, is used to initiate a hash chain. At 412a, the main processor executes a first iteration of the cryptographic hash function. At 414a, the main processor 402 calls the first co-processor 404 and the second co-processor 406. The main processor 402 calls the first co-processor 404 by sending a co-processor input 420a to the first co-processor 404. The co-processor input 420a can include the submitted password, information derived from the submitted password, or any combination of these and other information. The main processor 402 calls the second co-processor 406 by sending a co-processor input 420b to the second co-processor 406. The co-processor input 420b can include the same, additional, or different information than the co-processor input 420a.

At 422a, the second co-processor 406 generates a co-processor output 424a by evaluating a co-processor function based on the co-processor input 420b. The second co-processor 406 provides the co-processor output 424b to the main processor 402. At 416a, the main processor 402 evaluates the hash function based on the co-processor output 424a. For example, the co-processor output 424a or information derived from the co-processor output 424a can be used as an input to the hash function evaluated by the main processor 404. The hash function may be evaluated based on additional information. For example, the hash function may be evaluated based additionally on a salt, a counter value for the first iteration, or any combination of these and other information.

At 412b, the main processor executes a second iteration of the cryptographic hash function. The second iteration can be evaluated based on the output of the first iteration. At 414a, the main processor 402 calls the second co-processor 406.

The main processor 402 calls the second co-processor 406 by sending another co-processor input 420c to the second co-processor 406. The co-processor input 420c can include the output from the first iteration of the cryptographic hash function, information derived from the output from the first iteration of the cryptographic hash function, or any combination of these and other information.

At 422b, the first co-processor 404 generates a co-processor output 424b by evaluating a co-processor function based on the co-processor input 420a. The first co-processor 404 provides the co-processor output 424b to the main processor 402. At 422c, the second co-processor 406 generates a co-processor output 424c by evaluating a co-processor function based on the co-processor input 420c. The second co-processor 406 provides the co-processor output 424c to the main processor 402.

At 416b, the main processor 402 evaluates the hash function based on the co-processor output 424b and the co-processor output 424c. For example, the co-processor outputs 424b, 424c or information derived from the co-processor outputs 424b, 424c can be used as an input to the hash function evaluated by the main processor 404. The hash function may be evaluated based on additional information. For example, the hash function may be evaluated based additionally on a salt, a counter value for the second iteration, or any combination of these and other information.

Subsequent iterations of the cryptographic hash function can be executed by the main processor in a similar manner as the first and second iterations. In the example process 400, a hash chain output is generated by executing a predetermined number of iterations of the hash function. For example, in some implementations, two, five, ten, one hundred, one thousand, or another number of iterations can be used. At 440, the tail of the hash chain output is compared to the stored value. At 442, if the tail of the hash chain matches the stored value, access to the mobile device may be granted; if the tail of the hash chain does not match the stored value, access to the mobile device may be denied.

In some cases, if access is denied at 442, the user has submits another password, and all or part of the process 400 can be repeated based on the new submitted password. In some implementations, the user is limited to trying a certain number of incorrect passwords before access is denied for an extended period (e.g., hours, days, or permanently). For example, if the user submits ten incorrect passwords in a row, the mobile device can shut down, send a distress signal, or take other cautionary measures.

In some implementations, the first co-processor 404 and the second co-processor 406 evaluate different co-processor functions. For example, the first co-processor may evaluate a discrete cosine transform and the second co-processor may evaluate an AES encryption function. Moreover, each of the co-processors may be capable of evaluating multiple different co-processor function. For example, different cryptographic parameters may be used when the encryption function is evaluated by the second co-processor at 422a and 422b. The co-processor inputs can indicate the co-processor function to be evaluated each time the co-processor is called by the main processor 402.

In the example shown in FIG. 4, every iteration of the hash function utilizes an input value provided by the second co-processor 406, every second iteration of the hash function utilizes an input value provided by the first co-processor 404. This type of scheme may be useful where the first co-processor utilizes or requires more time than the second co-processor to evaluate the co-processor function. For example, as shown in FIG. 4, the co-processor function may be evaluated by the first co-processor 404 after the main processor 402 calls the first co-processor 404 at 414a and before the main processor 402 evaluates the hash function at 416b. Similarly, the co-processor function may be evaluated by the second co-processor 406 at any time after the main processor 402 calls the second co-processor 406 at 414a and before the main processor 402 evaluates the hash function at 416a. As such, in the example shown in FIG. 4, the first co-processor has more time than the second co-processor to evaluate the co-processor function.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a system having a display device, e.g., a screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect, a password is verified on a mobile device having a main processor and a co-processor. The password is verified based on operations performed by the main processor and operations performed by the co-processor.

In some aspects, a submitted password value is received on a mobile device that includes a main processor and a co-processor. The co-processor of the mobile device is called to provide a hash chain input value based on the submitted password value. A hash chain is evaluated by the main processor based on the hash chain input value provided by the co-processor. Evaluating the hash chain generates a submitted password verification value. The submitted password verification value is compared to a stored password verification value stored on the mobile device.

Implementations of these and other aspects can include one or more of the following features. Evaluating the hash chain by the main processor includes evaluating a first iteration of a cryptographic hashing function H based on the hash chain input value provided by the co-processor. Evaluating the hash chain by the main processor includes evaluating subsequent iterations of the cryptographic hashing function H based on an output of one or more prior iterations of the cryptographic hashing function H. Each iteration of the cryptographic hashing function H is evaluated based additionally on a salt value and a counter value for the iteration. The hash chain input value includes a first hash chain input value. The co-processor is called to provide subsequent hash chain input values. A subset of the subsequent iterations of the cryptographic hashing function H are evaluated based the subsequent hash chain input values provided by the co-processor. A vector stored on the mobile device is accessed, and the subset of the subsequent iterations are identified based on the vector. The subset are selected based on relative computing times for evaluating a co-processor function at the co-processor and evaluating the cryptographic hashing function at a main processor.

Additionally or alternatively, implementations of these and other aspects can include one or more of the following features. Calling the co-processor to provide the first hash chain input value includes providing a first co-processor input value from the main processor to the co-processor. The first co-processor input value is based on the submitted password value. Calling the co-processor to provide the first hash chain input value includes receiving the first hash chain input value at the main processor in response to providing the first co-processor input value to the co-processor. Calling the co-processor to provide the subsequent hash chain input values includes providing subsequent co-processor input values from the main processor to the co-processor. Each of the subsequent co-processor input values is based on an output of one or more of the prior iterations of the cryptographic hashing function H. Calling the co-processor to provide the subsequent hash chain input values includes receiving the subsequent hash chain input values at the main processor in response to providing the subsequent co-processor input values to the co-processor.

Additionally or alternatively, implementations of these and other aspects can include one or more of the following features. The co-processor is a first co-processor of the mobile device, and the hash chain input value is a first hash chain input value. A second co-processor of the mobile device is called to provide a second hash chain input value based on the submitted password value. The hash chain is evaluated by the main processor based on the first hash chain input value and the second hash chain input value. The first co-processor is a multi-media co-processor and the second co-processor is a cryptographic co-processor. The first co-processor provides the first hash chain input value by evaluating a discrete cosine transform function. The second co-processor provides the second hash chain input value by evaluating at least one of an AES encryption function or AES decryption function. Access to functionality of the mobile device is granted or denied based on identifying that the submitted password verification value matches the stored password verification value.

In some aspects, a hash chain utilizes hardware available on a mobile device to increase the difficulty of evaluating the hash chain. Co-processors are used in evaluating the hash chain. The co-processors include a multi-media accelerator. The co-processors include a cryptographic accelerator. The co-processor computations are mixed into the hash chain at a rate that allows the co-processors to run at their most efficient rate. The computation to be mixed into the hash chain is selected by a vector stored with the hash chain output, a salt, and counter information.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A mobile device comprising:
  a user interface operable to receive a submitted password value based on a user interaction;
  a co-processor operable to evaluate a co-processor function;
  a main processor communicably coupled to the co-processor, wherein both the main processor and the co-processor are located in the mobile device; and
  a computer-readable medium storing instructions that are executable by the main processor to perform operations comprising:
    calling the co-processor of the mobile device to provide a hash chain input value based on the submitted password value;
    evaluating, at the mobile device, a hash chain based on the hash chain input value provided by the co-processor, wherein evaluating the hash chain comprises generating a submitted password verification value that is different than the submitted password value; and
    comparing, at the mobile device, the submitted password verification value to a stored password verification value stored on the mobile device, wherein the stored password verification value was stored on the mobile device prior to receiving the submitted password value.

2. The mobile device of claim 1, wherein the co-processor comprises a first co-processor operable to evaluate a first co-processor function, the hash chain input value comprises a first hash chain input value, the mobile device further comprises a second co-processor operable to evaluate a second co-processor function, and the main processor is communicably coupled to the second processor, wherein the operations further include:
  calling the second co-processor to provide a second hash chain input value based on the submitted password value,
  wherein evaluating the hash chain by the main processor comprises evaluating the hash chain based on the first hash chain input value and the second hash chain input value.

3. The mobile device of claim 2, wherein the first co-processor comprises a multi-media co-processor and the second co-processor comprises a cryptographic co-processor.

4. The mobile device of claim 2, further comprising a communication bus that provides communication between the main processor and the first co-processor, and between the main processor and the second co-processor.

5. The mobile device of claim 1, wherein evaluating the hash chain includes:
  evaluating a first iteration of a cryptographic hashing function H based on the hash chain input value provided by the co-processor; and evaluating subsequent iterations of the cryptographic hashing function H based on an output of one or more prior iterations of the cryptographic hashing function H.

6. The mobile device of claim 1, wherein calling the co-processor comprises calling the co-processor to provide the hash chain input value based on the submitted password value, a salt value, and a counter value.

7. A method for verifying a password on a mobile device having a main processor and a co-processor, the method comprising:
   receiving a submitted password value on a mobile device that includes a main processor and a co-processor;
   calling the co-processor of the mobile device to provide a hash chain input value based on the submitted password value;
   evaluating, at the mobile device, a hash chain by the main processor based on the hash chain input value provided by the co-processor, wherein evaluating the hash chain comprises generating a submitted password verification value that is different than the submitted password value; and
   comparing, at the mobile device, the submitted password verification value to a stored password verification value stored on the mobile device, wherein the stored password verification value was stored on the mobile device prior to receiving the submitted password value.

8. The method of claim 7, wherein evaluating the hash chain by the main processor includes:
   evaluating a first iteration of a cryptographic hashing function H based on the hash chain input value provided by the co-processor; and
   evaluating subsequent iterations of the cryptographic hashing function H based on an output of one or more prior iterations of the cryptographic hashing function H.

9. The method of claim 8, wherein each iteration of the cryptographic hashing function H is evaluated based additionally on a salt value and a counter value for the iteration.

10. The method of claim 8, wherein the hash chain input value comprises a first hash chain input value, the method further comprising calling the co-processor to provide subsequent hash chain input values, wherein a subset of the subsequent iterations of the cryptographic hashing function H are evaluated based the subsequent hash chain input values provided by the co-processor.

11. The method of claim 10, further comprising:
    accessing a vector stored on the mobile device; and
    identifying the subset of the subsequent iterations based on the vector.

12. The method of claim 10, wherein the subset are selected based on relative computing times for evaluating a co-processor function at the co-processor and evaluating the cryptographic hashing function at a main processor.

13. The method of claim 10, wherein calling the co-processor to provide the first hash chain input value comprises:
    providing a first co-processor input value from the main processor to the co-processor, wherein the first co-processor input value is based on the submitted password value; and
    receiving the first hash chain input value at the main processor in response to providing the first co-processor input value to the co-processor.

14. The method of claim 13, wherein calling the co-processor to provide the subsequent hash chain input values comprises:
    providing subsequent co-processor input values from the main processor to the co-processor, wherein each of the subsequent co-processor input values is based on an output of one or more iterations of the cryptographic hashing function H; and
    receiving the subsequent hash chain input value at the main processor in response to providing the subsequent co-processor input values to the co-processor.

15. The method of claim 7, wherein the co-processor comprises a first co-processor of the mobile device and the hash chain input value comprises a first hash chain input value, the method further comprising:
    calling a second co-processor of the mobile device to provide a second hash chain input value based on the submitted password value,
    wherein evaluating the hash chain by the main processor comprises evaluating the hash chain based on the first hash chain input value and the second hash chain input value.

16. The method of claim 15, wherein the first co-processor provides the first hash chain input value by evaluating a discrete cosine transform function, and the second co-processor provides the second hash chain input value by evaluating at least one of an AES encryption function or AES decryption function.

17. The method of claim 7, further comprising granting access to functionality of the mobile device based on identifying that the submitted password verification value matches the stored password verification value.

18. The method of claim 7, further comprising denying access to functionality of the mobile device based on identifying that the submitted password verification value does not match the stored password verification value.

19. A non-transitory computer-readable medium storing instructions that are operable when executed by data processing apparatus to perform operations for verifying a submitted password, the operations comprising:
    receiving a submitted password value on a mobile device that includes a main processor and a co-processor;
    calling the co-processor of the mobile device to provide a hash chain input value based on the submitted password value;
    evaluating, at the mobile device, a hash chain by the main processor based on the hash chain input value provided by the co-processor, wherein evaluating the hash chain comprises generating a submitted password verification value that is different than the submitted password value; and
    comparing, at the mobile device, the submitted password verification value to a stored password verification value stored on the mobile device, wherein the stored password verification value was stored on the mobile device prior to receiving the submitted password value.

20. The computer-readable medium of claim 19, wherein the co-processor comprises a first co-processor of the mobile device and the hash chain input value comprises a first hash chain input value, the operations further comprising:
    calling a second co-processor of the mobile device to provide a second hash chain input value based on the submitted password value,
    wherein evaluating the hash chain by the main processor comprises evaluating the hash chain based on the first hash chain input value and the second hash chain input value.

21. The computer-readable medium of claim 19, wherein evaluating the hash chain by the main processor includes:
    evaluating a first iteration of a cryptographic hashing function H based on the hash chain input value provided by the co-processor; and evaluating subsequent iterations of the cryptographic hashing function H based on an output of one or more prior iterations of the cryptographic hashing function H.

22. The computer-readable medium of claim 19, wherein evaluating the hash chain comprises evaluating iterations of a cryptographic hashing function H, wherein a subset of the iterations utilize hash chain input values provided by the co-processor.

23. The computer-readable medium of claim 22, wherein the subset of iterations is designated based on particular data processing hardware components of the mobile device.

* * * * *